US006831729B1

(12) United States Patent
Davies

(10) Patent No.: US 6,831,729 B1
(45) Date of Patent: Dec. 14, 2004

(54) APPARATUS AND METHOD OF USING SAME FOR SYNCHRONIZING FILM WITH SOUND

(76) Inventor: Matthew L. Davies, 121 Logan Ave., Toronto (CA), M4M 2M9

( * ) Notice: Subject to any disclaimer, the term of this patent is extended or adjusted under 35 U.S.C. 154(b) by 0 days.

(21) Appl. No.: 10/310,898

(22) Filed: Dec. 6, 2002

Related U.S. Application Data

(60) Provisional application No. 60/336,171, filed on Dec. 6, 2001.

(51) Int. Cl.[7] .......................... G03B 31/00; G03B 21/32
(52) U.S. Cl. .............................. 352/3; 352/12; 352/90
(58) Field of Search ............................ 353/3, 12, 17, 353/18, 22, 23, 90, 244; 386/61, 62

(56) References Cited

U.S. PATENT DOCUMENTS 5,457,507 A * 10/1995 Berardi ........................ 352/3
5,638,151 A * 6/1997 Berardi ........................ 352/3

OTHER PUBLICATIONS

SMPTE Time Code, 2001.*

* cited by examiner

*Primary Examiner*—David Gray
*Assistant Examiner*—Arthur A Smith
(74) *Attorney, Agent, or Firm*—Deeth Williams Wall LLP; Douglas N. Deeth; Gervas W. Wall

(57) ABSTRACT

The present invention concerns a clapper device and method for synchronizing the auditory and visual elements in motion picture film production. The device has a standard clapper, a means of receiving timecode from an audio recorder (by wireless transmission or by cable or by some other means), a visual display for indicating a machine readable code indicating the stage of the filming process, onboard processing and storage, and a data entry means. The timecode information and machine code displayed corresponding to the point of time when the clapper is closed are used to synchronize the auditory and visual elements after digitization of the same.

3 Claims, 3 Drawing Sheets

APPARATUS AND METHOD OF USING SAME FOR SYNCHRONIZING FILM WITH SOUND

This application claims the benefit under 35 USC §119(e) of the following provisional application filed Dec. 6, 2001: U.S. Ser. No. 60/336,171 entitled "Apparatus and Method of Using Same for Synchronizing Film With Sound".

BACKGROUND OF THE INVENTION

1. Field of the Invention

This invention relates to an electronic clapper board and a method of using the electronic clapper board for synchronizing film.

2. Description of the Prior Art

Since the advent of film with soundtrack, or "Talkies", film makers had to devise methods of combining sound recorded on the set with the corresponding film footage, because while the picture was recorded onto film within a camera, sound was recorded onto tape on it's own separate apparatus with it's own power and controls and operated totally independent of the camera.

The simplest technique of combining the picture and the sound is the use of the Clapper Board or Slate. A person holds the clapper board in front of the camera, shouts out the scene, slate and take number, and then claps the slate shut.

The clapping sound is useful in matching a specific visual event to a specific auditory event. An editor looks at the film one frame at a time to locate the exact frame when the clapper board shut. The editor then listens to the sound one frame at a time to find the exact frame when the corresponding "clap sound" begins. The exact frame when the clapper board shut and the "clap sound" begins is called the Sync Frame.

Until the advent of video recording, sound to film synchronization was performed by mechanical means. This mainly relied on sprockets in the film and in special sprocketed recording tape. Relative timing adjustments could be made by slipping sprocket holes, so when video arrived an electronic equivalent was needed to take the place of mechanical methods and synchronization.

In 1967, the US Society of Motion Pictures and Television Engineers introduced SMPTE timecode. SMPTE timecode is an 80 bit binary code. The original uses of SMPTE timecode include accurate video editing and synchronizing film soundtracks. The timing data in SMPTE takes the form of an eight digit twenty-four hour clock. The count consists of 0 to 59 seconds, 0 to 59 minutes, and 0 to 23 hours. The second is subdivided into a number of frames. The frame-rate is the number of times a second that the picture is updated so as to give the illusion of continuous movement. In North America, the frame-rate is 30 frames per second, but Europe uses a 25 frame per second timecode called EBU timecode.

The film industry generally uses a special clapper, commonly known as a Smart Slate, (U.S. Pat. No. 4,646,167) which has a running numeric display showing the timecode position of the audio recorders timecode. After the film is processed in a laboratory, it is transferred to videotape using a Telecine or scanner. This transfer is known as a "film to tape" transfer. During this transfer the editor goes through a series of steps to synchronize the picture and sound:

(a) the editor stops the film on the sync frame (the frame where the clapper closes) for a take;
(b) the editor then takes note of the timecode number which is displayed on the slates visual display;
(c) the timecode number is manually entered into a synchronizer;
(d) the synchronizer directs the audio recorder to go to that exact timecode address;

and the film and audio for the first take run in synchronization as they are recorded to videotape.

When the take is finished, the editor stops the videotape from recording and cues the film forward so he can find the exact frame where the dapper closed for take #2 and the process is repeated.

This process takes about four (4) hours and costs over a thousand dollars to synchronize one hour of film. That is, the service currently costs hundreds of dollars per hour performed with an average efficiency ratio of 4:1. If the production takes are less than thirty seconds in length, as in TV commercials, the synchronizing efficiency ratio can increase to 6:1 or 7:1.

Once the sound and picture have been synchronized to videotape, the videotape is then digitized into electronic format where the takes or parts thereof can be combined by a Non-Linear Editing System. These are non-linear due to their ability to manipulate the media in ways far more flexible than the linear counterparts. Instead of having to sequentially fast forward the tape through all the prior takes in order reach a specific take on the tape, a non-linear system permits access of the specific take in a direct fashion, for editing, recording or other purposes.

There is a need for an apparatus and associated method to automate the synchronization of auditory and visual elements.

SUMMARY OF THE INVENTION

This invention meets the above need by providing for a clapper board for synchronizing film with audio including: a body; operable sound producing means, attached to the body and adapted to present a simultaneous physical synchronizing video indication and an electrical synchronizing indication of when the said means is operated; a receiver in the body for receiving a plurality of audio timecodes transmitted from an audio recorder; a processor connected to the sound producing means for receiving the electrical synchronizing indication from the sound producing means and to the receiver for receiving the plurality of audio timecodes from the receiver, the processor adapted to send a synchronizing audio timecode associated with the moment when the electrical synchronizing indication is received; and data storage coupled to the processor.

In a variation, operable sound means of the clapper board includes a clapper. In a further variation, the operable sound means includes a display and the synchronizing video indication is a machine readable code presented on a display in the body. The data storage containing the synchronizing time code is read by a code reader.

This invention is also directed to a clapper board for synchronizing film with audio comprising: a body; a display embedded in one side of the body; a marker board embedded in a further side of the body; an alphanumeric keyboard in the body for entering film information for presentation on the display; a clapper hingeably attached to the body and adapted to present a synchronizing video indication by the display and an electrical synchronizing indication by contact with a micro contact in the body when the clapper is operated; a receiver in the body for receiving a plurality of audio timecodes transmitted from an audio recorder; a processor connected to the sound producing means for receiving the electrical indication from the sound producing means and to the receiver for receiving the plurality of audio timecodes from the receiver, the processor adapted to send a synchronizing audio timecode associated with the moment when the electrical indication is received; data storage coupled to the processor for storing the synchronizing audio timecode and the film information; and means for accessing the synchronizing audio timecode and the film information in the data storage.

DETAILED DESCRIPTION OF THE PREFERRED EMBODIMENTS

Figure 1:
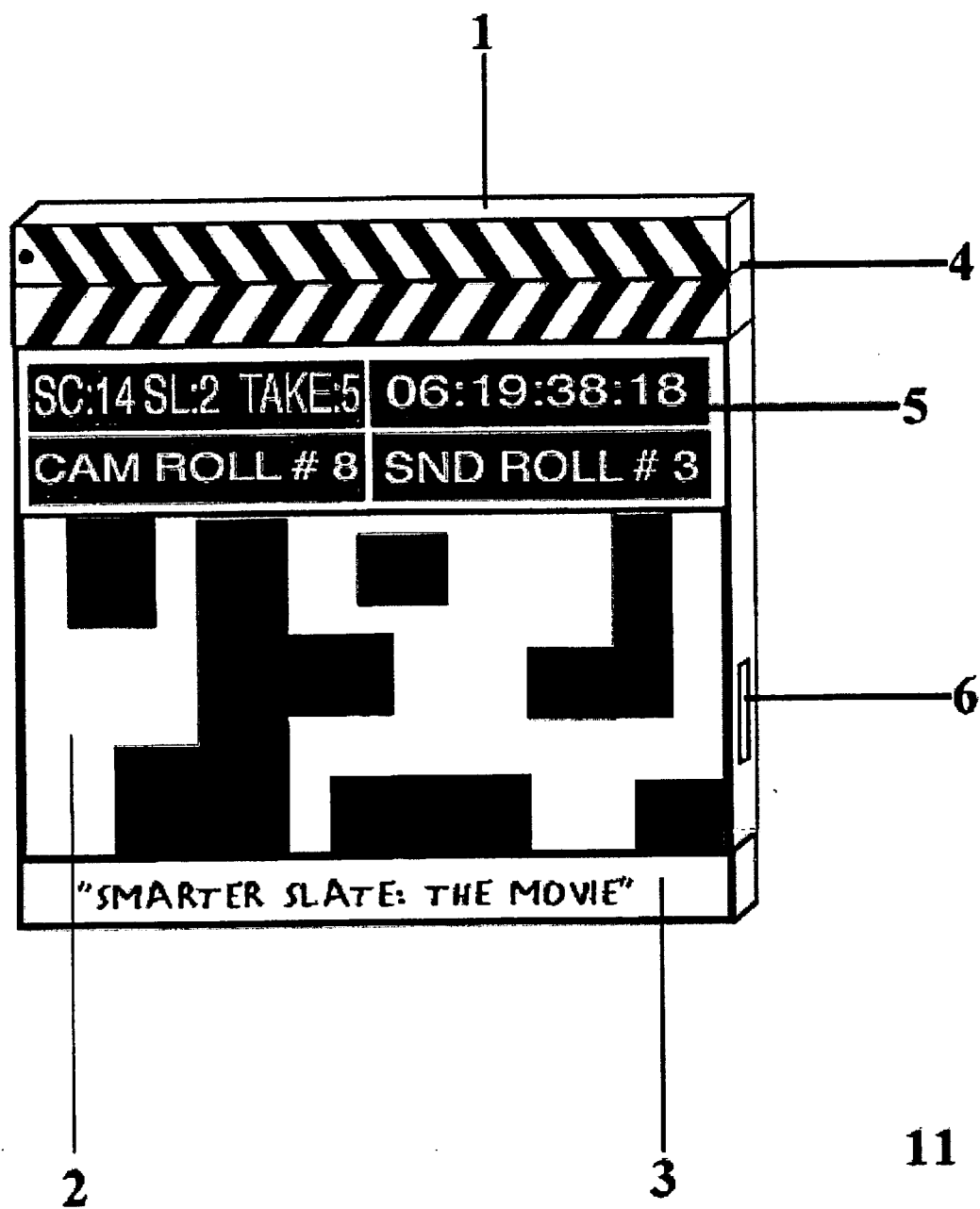
FIG. 1 is a front view of one embodiment of the invention.

Referring to FIG. 1, a preferred embodiment of the present invention is a clapper board or slate 11 with a conventional analog clapper 1, onboard processing, storage and a display 2 for displaying a machine readable code. An example of the use of machine readable code in general may be found in supermarkets. Retail items are marked with bar codes, which are read with bar code readers. The code is fed to a central processor, which determines the item type, cost, and remaining inventory. Information may then be used as part of the retail purchase process, or a process internal to the retailer, such as inventory control, accounting, finance, etc.

Code readers may be a dedicated software/hardware system or software executing on a general-purpose computer which processes digitized images, e.g. using pattern recognition techniques. Provided the purpose is achieved as set out below, no limitation as to form of the code reader is contemplated.

In another preferred embodiment, the clapper board or slate 11 does not provide for a display 2 for showing machine readable code but incorporate some of the other features mentioned below, in particular those associated with audio recording.

The machine readable code used by the preferred embodiment mentioned earlier would typically:

1. allow a specially programmed code reader 13 to self calibrate;
2. display the scene, slate, and take information for each given take; and
3. display the sync code at the moment the clapper 1 closes In addition to a machine readable code display 2 for the visual side (if present), the slate 1 of the preferred embodiment 11 would be equipped with a micro contact 4, so that when the slate closes the exact address of the sound recorder's timecode may be recorded. This timecode may be sent by an audio recorder to the preferred embodiment via wireless or by a cable or by some other means. The take information along with the timecode address of the sync frame for the sound recorder would be stored in a list on some electronic media 6 (typically removable). The storage of the list information can take one or more of a number of forms: wireless transmission from the slate 11 to a separate device for storage, an onboard storage device 6 for receiving removable storage media 6, and a mechanism for connecting by cabling to a separate storage device. This list could then be read by a computer as the audio is digitized so that each take would be recognized by its proper name, and the frame in the digital audio where the clapper 1 closed would be marked. A single computer may also be used for reading the list, digitizing the audio, and marking the sync frame. Variations include devices for reading and digitizing, and digitizing and marking.

Visual—Recording on the Set

Figure 2:
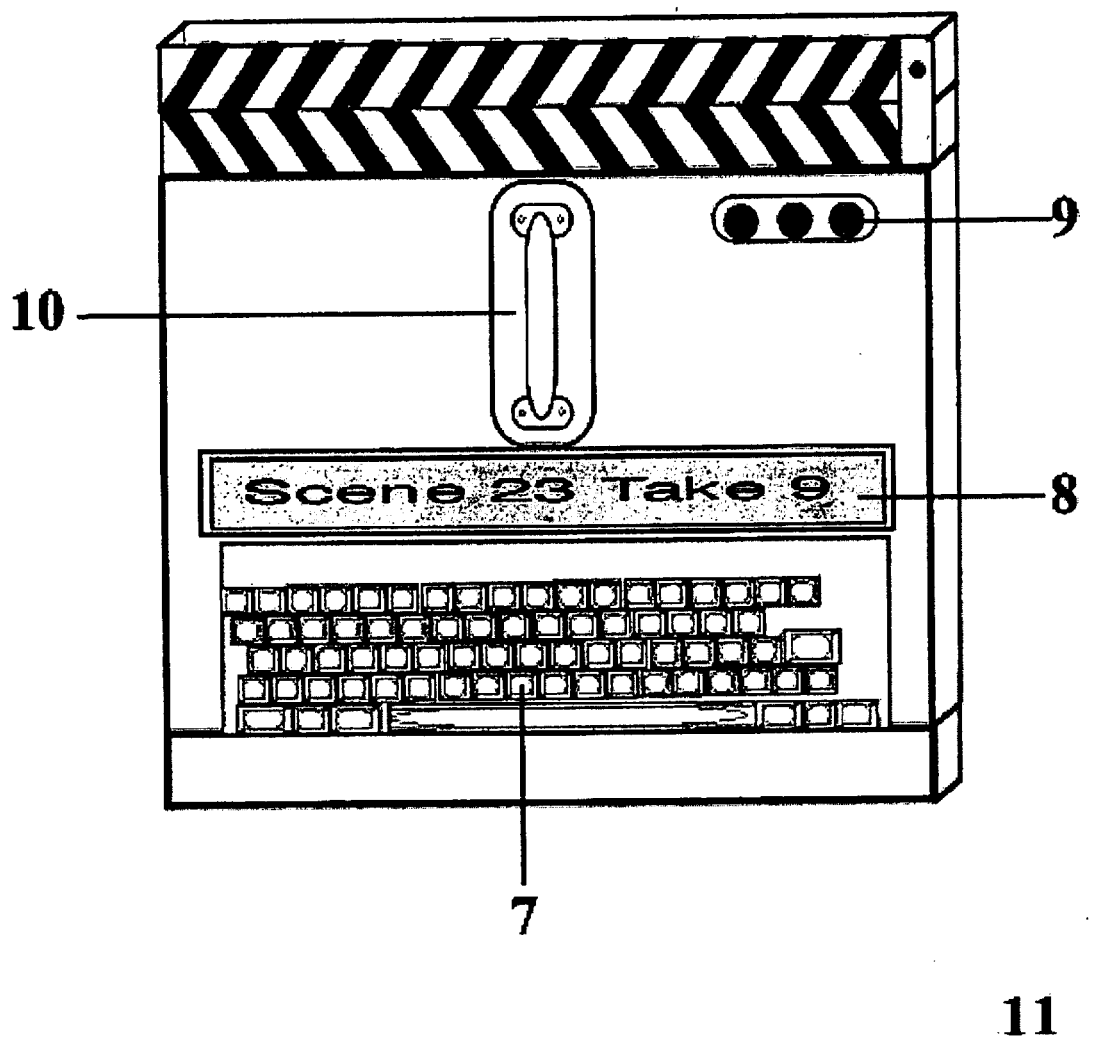
FIG. 2 is a rear view of the embodiment of FIG. 1.

In a preferred embodiment of the invention, the scene, slate and take information are loaded into the slate 11, which has a storage area and processor, using a keyboard 7 on the back of the slate 11 (see FIG. 2). In another variation, this information may be downloaded into the slate 11 using some telecommunication means, such as a port 6 on the slate 11 with an agreed protocol which governs the downloading of Information into the slate's 11 memory. When the clapper 1 is opened, it may display in one embodiment the "all on-all off" calibration code at a fixed interval in its code display 2. This enables a code reader 13 to calibrate its "on and off values" and locate the code within the video frame later in post-production. Then the slate 11 shows the scene, slate, and take numbers in machine readable code. This code may be quite coarse and may require multiplexing over a number of frames so as to convey all the information. Finally as the clapper is closed, it displays the "Sync" machine readable code, which would be uniform and unchanging.

As mentioned earlier, the presentation of such machine readable code is optional. In a preferred embodiment, visual synching occurs by the conventional method without the use of such machine readable codes.

Figure 3:
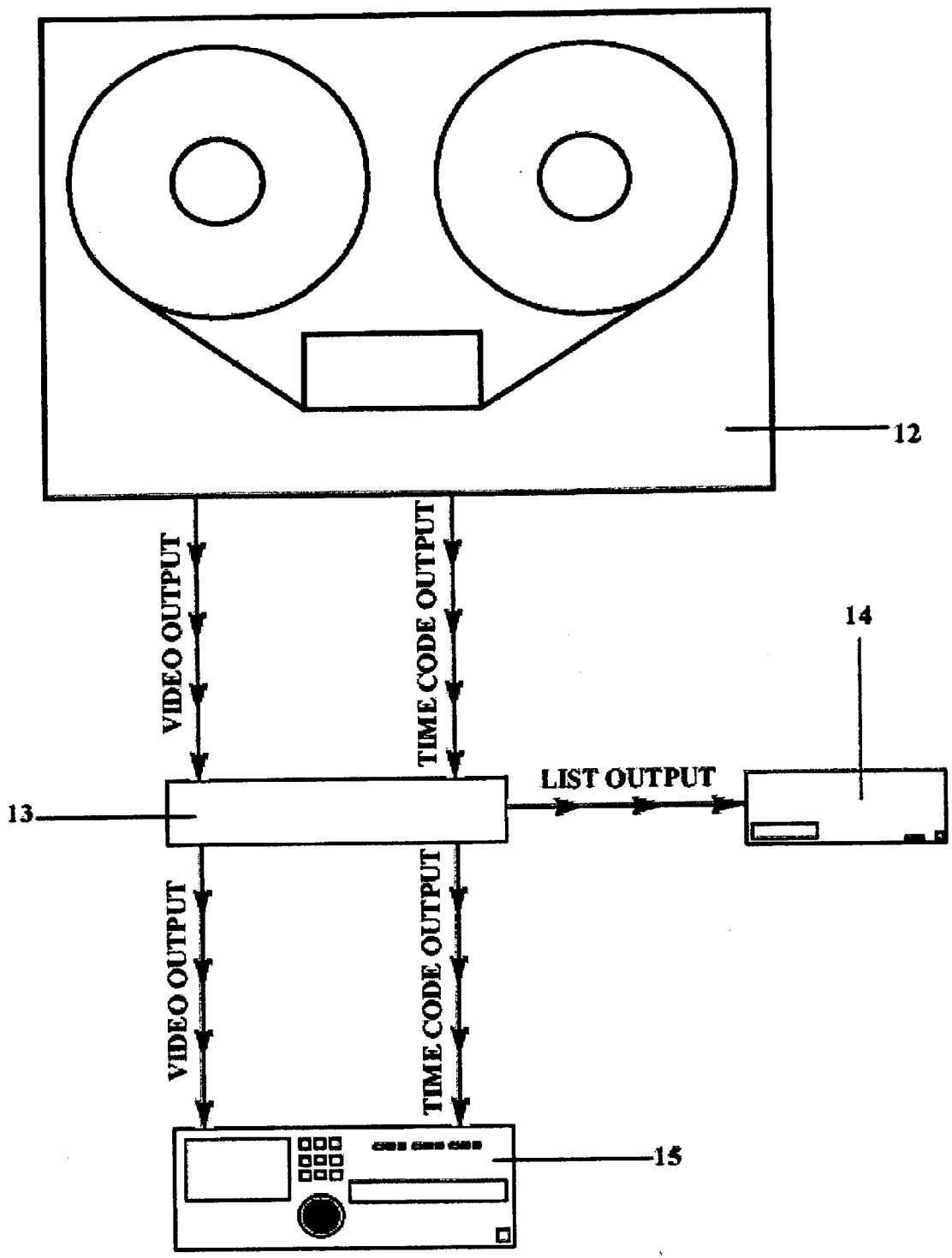
FIG. 3 shows the signal flow of the video post production process.

Visual—Post-Production (see FIG. 3)

If machine readable code is used, a code reader 13 identifies the machine readable code a contained on the film. As the film shot on set is transferred to video (e.g. D-Beta) on a telecine 12, the code reader examines the telecine's 12 output (see FIG. 3). When the slate 11 displays the "all on-all off" code, the code reader 13 calibrates to Identify where within the frame to look, and what constitutes an "on value" and what constitutes an "off value". When the slate 11 displays the scene, slate and take information, such are "read" by the code reader 13 and put into a list. When the slate 11 closes and displays the "sync" code, the code reader 13 captures the telecine's 12 timecode for that frame and adds it to the scene, slate and take information in the list to make one sync event. When all takes are transferred, the video and the list are digitized and transferred to permanent electronic storage 14, such as a CDROM, DVD, tape, or hard disk for editing. Software may then auto-name all the takes with their sync marks identified. At this point, the same or additional software could align the video and video sync marks for each take.

In another variation of the above, there is no "all on-all off" signal, and the code reader 13 always seeks the presence of sync codes.

In a further variation, the content of the film is first digitized before being processed by a code reader, which runs software to process the digitized images and determine the sync information.

In the case of preferred embodiments where there is no machine readable code, visual synching occurs by the conventional manual method. The sync frames are located by determining the frames when the analog clapper closed. For automatic processing, this information (including the slate-scene-take) may then be electronically recorded for later use together with the audio sync information.

Audio—Recording on the Set

The scene, slate, and take information are loaded into an electronic storage area on the slate 11. As mentioned earlier, the means for doing so include a keyboard 7 on the slate itself electronically connected to the storage area (see FIG.

2), or means external to the slate. When the clapper 1 is opened, its internal timecode generator typically begins to receive timecode transmitted by the audio recorder (timecode Nagra, timecode DAT, or other timecode controlled audio recorder). The slate's 11 internal timecode generator then creates a stream of timecode which is exactly aligned with the timecode stream received from the audio recorder.

Transmission between the audio recorder and the slate 11 is preferably by radio frequency (RF) but maybe by a cable or by some other means means, being either connected to or part of the audio recorder.

When the clapper 1 closes, the micro contacts 4 connect and the slate 11 records the timecode address of its own internal timecode generator (which is now generating timecode synchronous with the audio recorder's timecode) and adds this information to the scene, slate and take information kept in the slate 11 storage. This completes one sync event containing the scene, slate, and take numbers plus the timecode address of where the clapper 1 closed for that take. All sync events are typically recorded in list form onto some removable electronic storage media on the slate 6, e.g. flash RAM.

In a variation of the above, the timecode signal (and the slate-scene-take information) is generated and transmitted by the slate 11, and the audio recorder receives and records the transmitted signal. The location on the audio recording at the point when the signal is received will then be kept in storage by the audio recorder for later synchronization with the visual portion. The place of storage is preferably on separate removable media, but may be within the unused bits of the audio recorder's time code which would be recorded onto the audio recorder's media, whether it be magnetic tape, hard disk or some other media.

Audio —Post-Production

The recorded audio is transferred to a storage device along with the list of sync events information on the removable storage media. The regions are auto-named with their sync marks identified. With both the auditory and visual elements now digitized and their sync frames for each take noted, a software program may then align the corresponding regions of the sound and picture together thus synchronizing an entire day's filming in moments.

Preferred Features

A preferred embodiment of the invention would take the overall physical form of a typical slate 11 augmented with the following:

a. electronic processing and storage capability;
b. a standard analogue clapper 1;
c. micro-contacts 4 to capture the exact timecode address when the micro-contacts 4 connect and to activate the "sync" machine readable code;
d. an alphanumeric keyboard 7 on the reverse side of the slate 11 for data entry. An on-board keyboard 7 would preferably be lockable; The slate 11 may also contain a port for data entry by external means 6 such as a keyboard or numeric keypad;
e. a marker board 3 for noting the production name or information backup;
f. one or more displays 5 for showing scene, slate, and take information, and machine readable code thereof 2, and audio recorder's timecode. The displays 5 may use suspended particle device (SPD) technology as described in U.S. Pat. No. 5,650,872 and related patents and patent applications; and
g. a mechanism for transmitting information to a separate receiver coupled with a storage device, connecting means to a storage device, or an on-board storage device 6 for receiving removable storage media.

Additional features, typically on the reverse side of the slate to the display, may include light emitting diode displays 9 for indicating the status of the front panel display 5, a display 8 (typically backlit liquid crystal display) for showing the content of the slate storage, and a means 10 to handle the slate 11.

Embodiments of this invention also includes methods for automating the synchronization of audio to video for the film process using the above mentioned apparatus in its various embodiments in the different fashions outlined above.

It will be appreciated that the above description relates to the preferred embodiments by way of example only. Many variations on the apparatus and method for delivering the invention will be dear to those knowledgeable in the field, and such variations are within the scope of the invention as described and claimed, whether or not expressly described.

What is claimed is:

1. A clapper board for synchronizing film with audio, comprising:

(a) a body;
(b) operable sound producing means, attached to the body and adapted to present a simultaneous physical synchronizing video indication and an electrical synchronizing indication of when the said means is operated;
(c) a receiver in the body for receiving a timecode transmitted from an audio recorder;
(d) a processor connected to the sound producing means for receiving the electrical synchronizing indication from the sound producing means and to the receiver for receiving the plurality of audio timecodes from the receiver, the processor adapted to send a synchronizing audio timecode associated with the moment when the electrical synchronizing indication is received; and
(e) removable data storage coupled to the processor, wherein the operable sound means includes a display and the synchronizing video indication is a machine readable code presented on a display in the body.

2. The board of claim 1 wherein the data storage containing the synchronizing time code is read by a code reader.

3. A clapper board for synchronizing film with audio comprising:

(a) a body;
(b) a display embedded in one side of the body;
(c) a marker board embedded in a further side of the body;
(d) an alphanumeric keyboard in the body for entering film information for presentation on the display;
(e) a clapper hingeably attached to the body and adapted to present a synchronizing video indication by the display and an electrical synchronizing indication by contact with a micro contact in the body when the clapper is operated;
(f) a receiver in the body for receiving a timecode transmitted from an audio recorder;
(g) a processor connected to the sound producing means for receiving the electrical indication from the sound producing means and to the receiver for receiving the timecode from the receiver, the processor adapted to send a synchronizing audio timecode associated with the moment when the electrical indication is received;
(h) removable data storage coupled to the processor for storing the synchronizing audio timecode and the film information; and
(i) means for accessing the synchronizing audio timecode and the film information in the data storage.

* * * * *